United States Patent [19]

Haneda et al.

[11] Patent Number: 5,159,466
[45] Date of Patent: Oct. 27, 1992

[54] FACSIMILE APPARATUS WITH SELECTABLE DATA IMAGE CODING

[75] Inventors: Isamu Haneda; Isao Sonoda, both of Soraku, Japan

[73] Assignee: Sharp Kabushiki Kaisha, Japan

[21] Appl. No.: 728,685

[22] Filed: Jul. 12, 1991

[30] Foreign Application Priority Data

Jul. 20, 1990 [JP] Japan .................................. 2-193563

[51] Int. Cl.[5] ............................................ H04M 11/00
[52] U.S. Cl. ...................................... 358/434; 358/435
[58] Field of Search .................................. 358/435-439

[56] References Cited

U.S. PATENT DOCUMENTS

| 4,734,780 | 3/1988 | Iwata et al. | 358/435 |
| 4,870,678 | 9/1989 | Adachi | 358/434 |
| 4,908,851 | 3/1990 | Kotani et al. | 358/436 |
| 4,918,723 | 4/1990 | Iggulden et al. | 358/438 |

Primary Examiner—Stephen Brinich
Attorney, Agent, or Firm—Nixon & Vanderhye

[57] ABSTRACT

A facsimile apparatus capable of enhancing a communication speed with another facsimile apparatus through a transmission line in a network includes a facsimile modem unit for quantizing image data and coding the image data quantized so that the coded image data is output, and a data terminal unit for supplying a first indication signal and a second indication signal and transmitting the image data in response to the first indication signal so that the coded image data is transmitted in response to the second indication signal. The facsimile modem unit includes a unit for quantizing image data to be inputted, a unit for coding the image data quantized in the quantize unit, and a unit for sending either the data coded in the coding unit or coded data supplied from the data terminal unit to the data transmission line. The data terminal unit includes a unit for supplying a first indication signal and a second indication signal, a unit for transmitting the image data to the modem unit in response to the first indication signal supplied from the supply unit, and a unit for transmitting the coded image data to the sending unit in response to the second indication signal supplied from the supply unit.

15 Claims, 6 Drawing Sheets

FACSIMILE APPARATUS WITH SELECTABLE DATA IMAGE CODING

BACKGROUND OF THE INVENTION

1. Field of the Invention

The present invention relates to a facsimile apparatus, and more particularly to the facsimile apparatus which includes a data terminal device and a facsimile modem device.

2. Description of the Related Art

In general, a facsimile system is so arranged that a facsimile apparatus for transmitting a still picture communicates with another facsimile apparatus for receiving the transmitted still picture through a communication path.

The still picture includes a certain amount of information (characters, digits, diagrams, etc.) on a definitive area. As for the characters included in the still picture, the most important feature in transmitting the still picture is a reproduction fidelity of the most fine characters on the receiving-side facsimile.

The indispensable factors of the facsimile apparatus are to reproduce the character style and to discern clearly the characters from one another. In order to cooperate the indispensable factors, in general, the facsimile apparatus is arranged to code the still picture in binary digits of black and white at a time when the picture information is extracted, transmitted and reproduced.

The inventors of the present invention know that there is a facsimile apparatus having a data terminal device and a facsimile modem device, both of which are connected through a serial data line so that the data is allowed to be serially transmitted therebetween. The facsimile modem device is also connected with a phone line.

The data terminal device is a terminal apparatus represented by a personal computer or a wordprocessor and includes a central processing unit (CPU), a read-only memory (ROM), a random access memory (RAM), a communication control unit, an I/O control unit, an image reading device and a keyboard.

The CPU is used to control and to monitor the data terminal device itself. The ROM, the RAM, the communication control unit and the I/O control unit are connected to the CPU so that the data is transmitted between the CPU and those elements.

The facsimile modem device includes a CPU, a ROM, a RAM, a modem LSI and a network control unit (NCU). The CPU is connected to the ROM, the RAM, and the modem LSI through a system bus so that the data is allowed to be transmitted between the CPU and the other elements as fast as possible.

The CPU is used to control and to monitor the facsimile modem device.

In operation, the data terminal device takes the following steps consisting of a step of reading one-line data contained in a subject copy (that is, one sheet of paper to be facsimile-transmitted) from the RAM, a step of expanding the read data into a bit image in the CPU in a case of the character data, a step of storing the bit image in the RAM, a step of compressing the bit-image data read from the RAM into the transmission data format, a step of transmitting the compressed data to the facsimile modem device through the communication control unit, a step of determining whether or not all the lines of the one-copy data (corresponding to the data of one sheet of paper to be transmitted) are transmitted.

When all the lines of the one-copy data are transmitted it proceeds to a step of transmitting a message indicating termination of the processing of one subject copy to the facsimile modem device.

However, when not all the lines of the one-copy data are transmitted, then it proceeds to a step of returning to the first step.

In a case that the data to be transmitted is image data optically scanned by the image reading device, the above-mentioned step of expanding the read data into a bit image is not necessary.

The facsimile modem device takes the following steps consisting of a step of storing the compressed data transmitted from the data terminal device in the RAM, a step of reading the data from the RAM under the control of the CPU, a step of transmitting it to the modem LSI, a step of modulating the data in the LSI, a step of transmitting the modulated data to the phone line through the network control unit which keeps the transmission characteristic optimal, a step of determining whether or not all lines contained in one-copy data are transmitted.

When all lines contained in one-copy data are transmitted, then it proceeds to a step of terminating the process.

However, when not all lines contained in one-copy data are transmitted, then it proceeds to a step of returning to the first step of storing the transmitted data in the RAM.

As will be understood from the above description, for transmitting the character data with the facisimile, the above-mentioned facsimile apparatus takes a step of quantizing (expanding) the character data into the image data (bit-image data) on the data terminal device, a step of coding (compressing) the image data for enabling facsimile transmission, and a step of transmitting the coded character data to the facsimile modem device.

Hence, it takes a considerably long time to execute the series of processes from the coding of the data to the transfer of the coded data to the facsimile modem device, resulting that a time is substantially consumed in order to carry out the facsimile transmission.

In a case that the image data is to be transmitted, the process of expanding the image data in the data terminal device is removed.

However, it is necessary to code (compress) the image data so that the data is allowed to be transmitted with the facsimile, resulting that a time is disadvantageously consumed in order to code the image data and to transfer the data from the data terminal device to the facsimile modem device.

Moreover, when the facsimile modem device is allowed to be connected to a data terminal device included in another facsimile apparatus, the data terminal device to be connected is indispensable to the provision of expansion of the data into the bit image and compression of the data into a data transmission format as well as an addition of a special function of enabling the compressed data to be transferred to the facsimile modem device of another facsimile apparatus, resulting that a freedom is constrained too much in the arrangement of the facsimile apparatus itself.

SUMMARY OF THE INVENTION

It is, therefore, an object of the present invention to provide a facsimile apparatus capable of enhancing a facsimile communication speed in a network.

The object of the present invention can be achieved by a facsimile apparatus capable of enhancing a communication speed with another facsimile apparatus through a transmission line in a network includes a facsimile modem unit for quantizing image data and coding the image data quantized so that the coded image data is output, and a data terminal unit for supplying a first indication signal and a second indication signal and transmitting the image data in response to the first indication signal so that the coded image data is transmitted in response to the second indication signal.

Preferably, the facsimile modem unit includes a unit for quantizing image data to be inputted, a unit for coding the image data quantized in the quantize unit, and a unit for sending either the data coded in the coding unit or coded data supplied from the data terminal unit to the data transmission line.

More preferably, the data terminal unit includes a unit for supplying a first indication signal and a second indication signal, a unit for transmitting the image data to the modem unit in response to the first indication signal supplied from the supply unit, and a unit for transmitting the coded image data to the sending unit in response to the second indication signal supplied from the supply unit.

Further preferably, the supply unit is an external input device for supplying the first indication signal for indicating a transmission of the image data to the facsimile modem unit and the second indication signal for indicating a transmission of the coded image data to the facsimile modem unit.

The external input device is preferably adapted to be operated in accordance with an operator of the facsimile device.

The facsimile modem unit includes a central processing unit for monitoring and controlling the facsimile modem unit, preferably.

The facsimile modem unit further includes a modem LSI for modulating the data to be transmitted and for demodulating the data received from an external thereof, preferably.

The facsimile modem unit further includes a network control unit for matching an impedance of a phone line to an impedance thereof, preferably.

Preferably, the facsimile modem unit further includes a ROM for storing a program required for performing a process of the data stored therein.

More preferably, the facsimile modem unit further includes a RAM for temporarily storing middle data to be transmitted through a system bus.

Further preferably, the data terminal unit includes a central processing unit for monitoring and controlling the data terminal unit.

The data terminal unit further includes a ROM for storing a program required for performing a process of the data stored therein, preferably.

The data terminal unit further includes a RAM for temporarily storing middle data to be transmitted through a system bus, preferably.

The data terminal unit further includes an I/O control unit for serving as an interface between the external input device and the data terminal unit, preferably.

The data terminal unit further includes a communication control unit for controlling communication between the data terminal unit and the facsimile modem unit, preferably.

Preferably, the external input device is an image reading device and/or a keyboard.

In operation, the facsimile apparatus according to the present invention is arranged to allow a user to optionally select one of the transmitting ways, that is, the way of quantizing and coding the image data in the facsimile modem device and transmitting the coded image data to the facsimile data transmission line and the other way of coding the image data in the data terminal device and transmitting the coded image data to the facsimile data transmission line through the send-out unit of the facsimile modem device.

The facsimile apparatus according to the present invention provides the facsimile modem device communicating with the data terminal device and transmission line, the facsimile modem device having a function of quantizing and coding the image data. Hence, the data is allowed to be transferred from the data terminal device to the facsimile modem device on a character code basis. It results in bringing about the effects of reducing the time taken in transmitting the data between the data terminal unit and the facsimile modem device as well as the time needed in performing the facsimile transmission.

Those effects make it possible to eliminate the necessity of providing a special function of quantizing and coding the image data in the data terminal device. Hence, the facsimile modem device is allowed to be connected to any kind of data terminal unit. It results in enhancing freedom of the arrangement of the facsimile apparatus itself.

Further objects and advantages of the present invention will be apparent from the following description of the preferred embodiment of the invention as illustrated in the accompanying drawings.

BRIEF DESCRIPTION OF THE DRAWINGS

FIG. 4 composed of FIGS. 4A, 4B and 4C is a flowchart showing the transmitting operation of the facsimile apparatus shown in FIG. 3.

DESCRIPTION OF THE PREFERRED EMBODIMENT

Referring to the accompanying drawings, a preferred embodiment of the present invention will be described in details in the followings.

Figure 1:
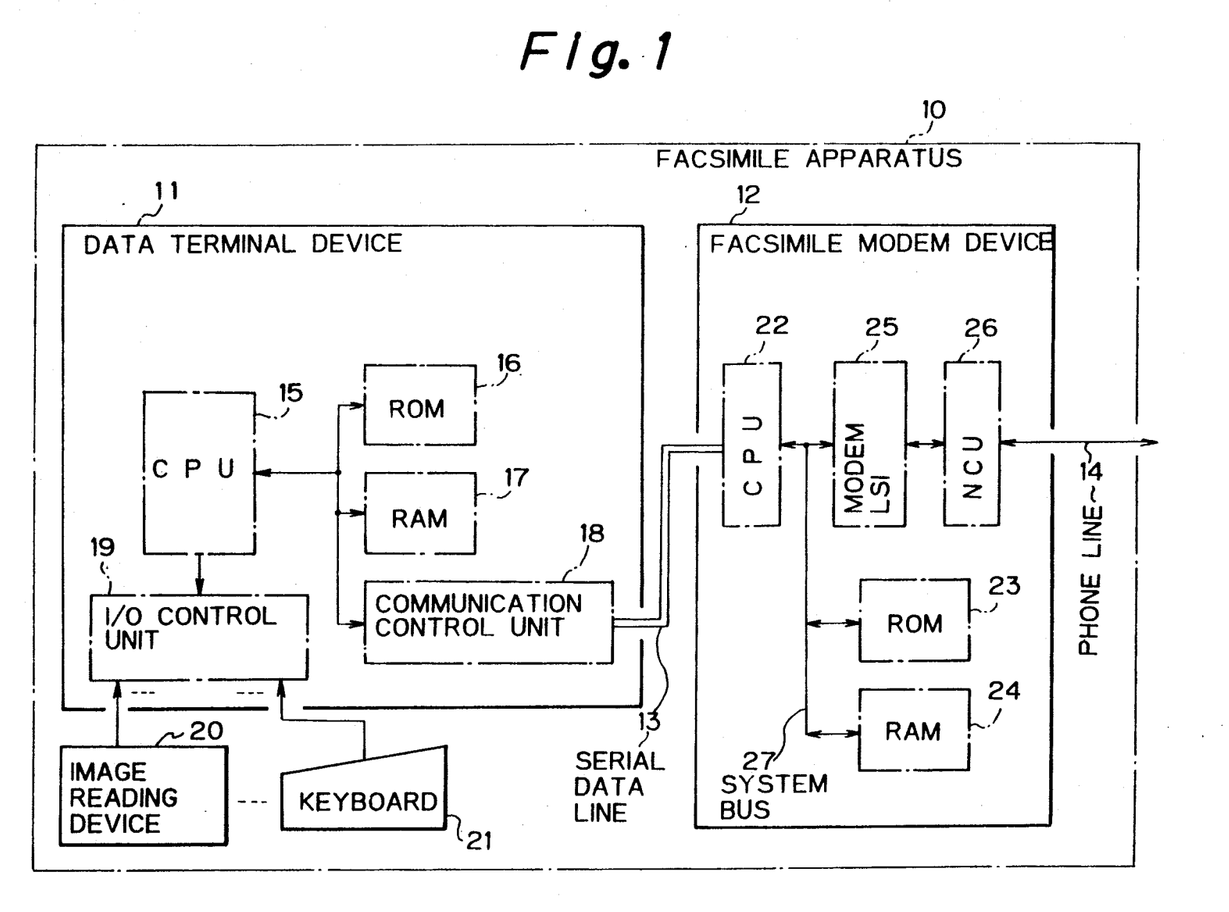
FIG. 1 is a schematic block diagram showing a basic concept of a facsimile apparatus according to the present invention.

FIG. 1 is a schematic block diagram showing a basic concept of a facsimile apparatus of the present invention.

As shown in FIG. 1, the facsimile apparatus 10 includes a data terminal device 11 and a facsimile modem device 12.

The data terminal device 11 is communicated with the facsimile modem device 12 through a serial data line 13 so that the data can be serially transmitted therebetween. The facsimile modem device 12 is also connected with a phone line 14.

The data terminal device 11 is a terminal which is representatively a personal computer or a wordprocessor apparatus and includes a central processing unit (CPU) 15, a read-only memory (ROM) 16, a random access memory (RAM) 17, a communication control unit 18, an I/O control unit 19, an image reading device 20, and a keyboard 21.

The CPU 15 is operated to control and to monitor the data terminal device 11 itself. The ROM 16, the RAM 17, the communication control unit 18 and the I/O control unit 19 are connected to the CPU 15 so that the data is transmitted between the CPU 15 and those elements 16, 17, 18, 19.

The ROM 16 stores a program for processing the data in the data terminal device 11. The RAM 17 contains a storage area served as a working area for processing the data and temporarily stores the middle data on the process.

The RAM 17 stores an image pattern corresponding to each character code. That is, the image pattern stored in the RAM 17 is arranged such that the characters corresponding to the character codes are expanded on the plane in a matrix manner. Hence, the CPU 15 serves to specify an address of the RAM 17 according to the character codes so as to read an image pattern corresponding to the character code in the specified storage area.

The communication control unit 18 has a function of controlling a transfer of information between the data terminal device 11 and the facsimile modem device 12. That is, the communication control unit 18 serves as an interface between the serial data line 13 and the data terminal device 11.

In operation, the communication control unit 18 is operated to receive one character of the data transmitted through the serial data line 13 in a serial bit-by-bit manner, build the character from the serially transmitted bits, and transfer the character to the CPU 15.

When transmitting the character, the communication control unit 18 operates to break the character into a bit train and serially send out the bit train onto the data line 13. That is, the operation performed in the communication control unit 18 is serial-to-parallel conversion. Further, the communication control unit 18 has a function of detecting an error on data transmission and interrupting the CPU 15 and monitoring the state of the serial data line 13 and interrupting the CPU 15 when an abnormal state is detected.

The I/O control unit 19 serves to connect the CPU 15 with the image reading device 20 and the keyboard 21, each of which is an external input device of the data terminal device 11.

The image reading device 20 serves to optically scan a subject copy (sheet of paper containing character, pictures, diagrams, etc. printed thereon) for reading the subject copy as image data and input the image data into the data terminal device 11.

The facsimile modem device 12 includes a CPU 22, a ROM 23, a RAM 24, a modem LSI 25, and a network control unit (NCU) 26. The CPU 22 is connected to the ROM 23, the RAM 24, and the modem LSI 25 through a system bus 27 so that the data is allowed to be transmitted between the CPU 22 and other components as fast as possible.

The CPU 22 has a function of controlling and monitoring the facsimile modem device 12.

The ROM 23 stores a program and data required for processing the data in the facsimile modem device 12 itself. The RAM 24 contains a storage area served as a working area for processing the data and an area where the middle data and the data to be transmitted or received are temporarily located.

The modem LSI 25 provides a modem function, that is, a function of modulating the data to be transmitted and of demodulating the data to be received. The modem function takes the steps of converting a binary serial pulse into an alternating signal, inputting the alternating signal to the phone line 14, and demodulating the alternating signal into the binary direct pulse for receiving the data.

The network control unit 26 serves to keep the impedance matching between the facsimile modem device 12 and the phone line 14 for the purpose of optimizing a transmission characteristic. That is, it takes the responsibility of the communication control.

The data is inputted through the image reading device 20 and the keyboard 21 included in the data terminal device 11 and is transferred to the facsimile modem device 12 through the serial data line 13. The data is modulated in the facsimile modem device 12 and then the modulated data is transmitted to a destination facsimile through the phone line 14. Conversely, the data transmitted from other facsimile through the phone line 14 is inputted into the facsimile modem device 12 in which the data is demodulated. Then, the demodulated data is transferred to the data terminal device 11 through the serial data line 13.

In a case that the data terminal device 11 is connected to an output device such as a printer or a display device, the data is allowed to be outputted to the outside.

Figure 2:
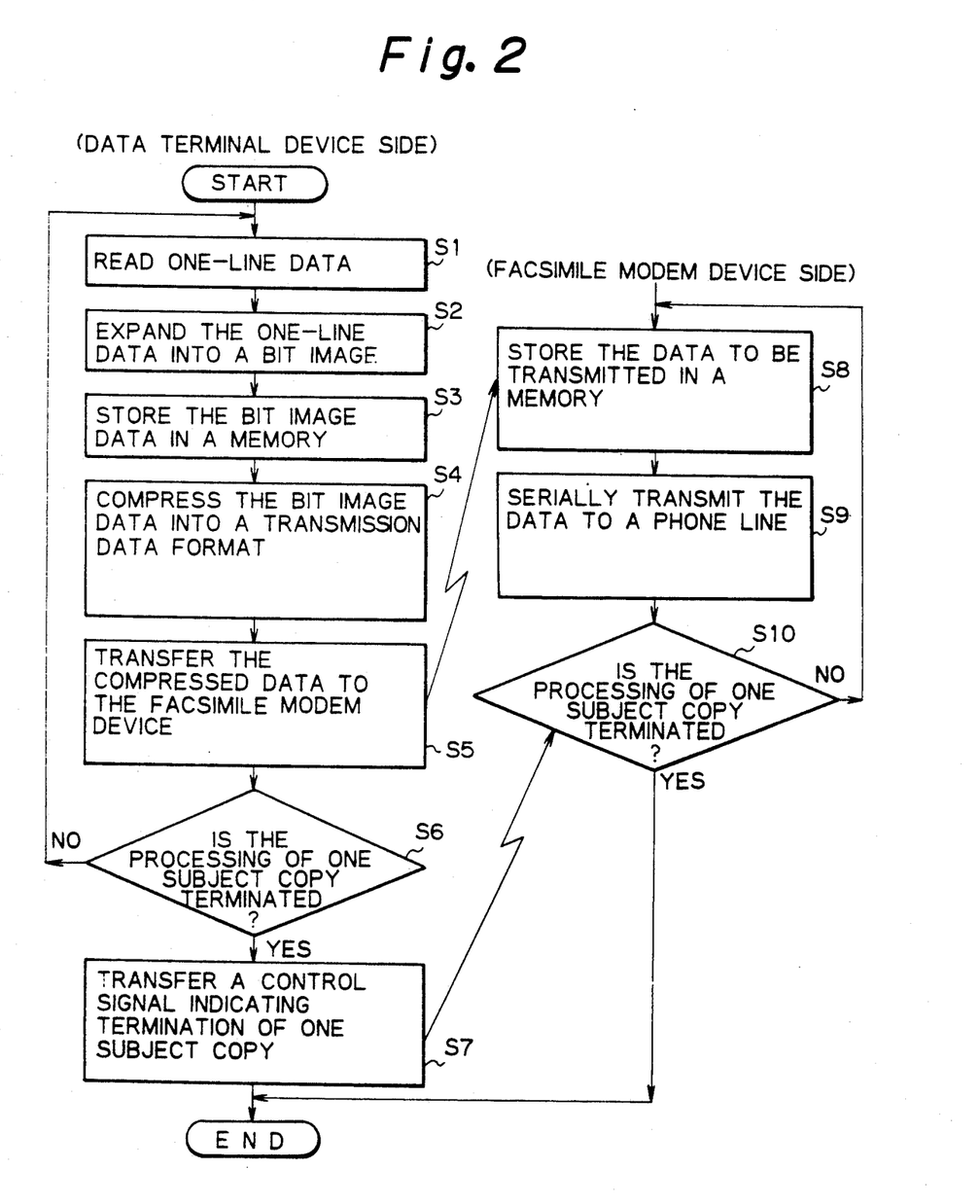
FIG. 2 is a flowchart showing the transmitting operation of the facsimile apparatus shown in FIG. 1.

FIG. 2 is a flowchart showing the operation of the facsimile apparatus executed in transmitting the data from the data terminal device 11 to the facsimile modem device 12 to the phone line 14. Concretely, the flowchart illustrates the processing routine for transmitting the data to another facsimile on the assumption that the data to be transmitted is one subject copy containing characters only.

The processing flow is executed when the facsimile apparatus 10 shown in FIG. 1 transmits the data. Hence, the flow is divided into the process for the data terminal device 11 and that for the facsimile modem device 12. The processing flow for the data terminal device 11 is stored as a program in the ROM 16 included in the data terminal device 11. The processing flow for the facsimile modem device 12 is stored as a program in the ROM 23 included in facsimile modem device 12.

The transmitting operation of the facsimile apparatus 10 will be described with reference to FIGS. 1 and 2.

In the following description, the phone line 14 is assumed as an exchange line. The description will be left out about the procedure of connecting the transmitting and the receiving facsimile apparatuses and establishing a line link and releasing the exchange line when terminating the communication.

At a step S1 of FIG. 2, the CPU 15 included in the data terminal device 11 serves to read one-line data (character data) of one subject copy. The character data of one subject copy indicates the character image data optically scanned by the image reading device 20 connected to the data terminal device 11 or the character code data inputted from the keyboard 21. The character data is pre-stored in the RAM 17. In the following description, the subject copy to be transmitted is assumed to be the one-copy data composed of character codes only inputted through the keyboard 21.

At the step S2, the data about one-line characters read at the step S10 is expanded to a binary bit image with one for black and zero for white according to the bit image pattern of the character codes pre-stored in the RAM 17.

The reading process of the bit image pattern from the RAM 17 uses the bit image pattern which is read from the address of the RAM 17 specified by the CPU 15 on a character-code basis. Hence, the RAM 17 pre-stores the bit image pattern corresponding to the character code.

The image data about one-line characters expanded into a bit image is temporarily stored in the RAM 17 at the step S3. Then, the process goes to a next step S4.

At the step S4, the CPU 15 serves to read the one-line image data temporarily stored in the RAM 17 at the step S3, to remove redundant signal components contained in the image data in light of the continuity of 0 and 1 signals, and coding the one-line image data for compressing the amount of one-line image data.

The compressed image signal (character data) includes such information as allowing the original signal to be completely restored.

At a next step S5, the character data compressed into a transmission data format is serially transferred to the CPU 22 of the facsimile modem device 12 through the serial data line 13 under the control of the communication control unit 18.

Proceeding to a step S6, it is determined whether or not all the processes at the step S1 to S5 are terminated about the one-copy data to be transmitted. This determination is based on whether or not all the lines contained in one-copy data stored in the RAM 17 are read out.

If, at the step S6, the process is terminated about one-copy data, the series of processes done in the data terminal device 11 are terminated such as an expansion of the data into the image data, a compression of the image data into a transmission format, and a transfer of the data to the facsimile modem device 20.

If, at the step S6, the process is not yet terminated, the process returns to the step S1 after which the foregoing process is repetitively executed one line by one line until all the lines contained in one subject copy are processed.

At a step S7, in response to the termination of the series of processes such as expansion of one-copy data into the image data, the compression of the image data into the transmission format, and the transmission of the data to the facsimile modem device 12, the CPU 15 serves to transmit a control signal indicating termination of one subject copy to the CPU 22 of the facsimile modem device 12 through the communication control unit 18 and the serial data line 13.

The description will be directed to the process executed in the facsimile modem device 12.

In response to data transmission done at the step S5 of the data terminal device 11, the facsimile modem device 12 starts the execution of the process from the step S8 to the later steps shown in FIG. 2.

At a step S8, the CPU 22 receives the one-line data compressed into the transmission format transferred from the data terminal device 11 to the facsimile modem device 12 through the serial data line 13 and temporarily stores the received data in the RAM 24 through the system bus 27.

At a step S9, the one-line coded data temporarily stored in the RAM 24 is serially read out and modulated in the modem LSI 25. Then, the modulated data is serially transmitted to the phone line 14 through the network control unit 26 which keeps the transmission characteristic optimal.

Proceeding to a step S10, it is determined whether or not all the data is to be sent out to the phone line 14. The determination is based on whether or not a control signal (signal transmitted at the step S7) is received indicating termination of the process for one-copy data given from the data terminal device 11 connected in the upstream through the serial data line 13. In the determination at the step S10, while the control signal is not received indicating termination of the process for one-copy data, the CPU 22 returns to the process at the step S8 from which the foregoing process is repetitively executed to send the one-copy data out to the phone line 14 one line by one line.

In response to the control signal, the series of processes at the steps S8 to S10 are terminated accordingly.

As described above, in the facsimile modem device 12, the data transmitted from the data terminal device 11 is temporarily stored in the RAM 24 and is serially read out to the phone line 14. This process is required for matching the line speed of the phone line 14 to the data transfer speed inside of the facsimile apparatus before transmitting the data to the destination facsimile at a high speed.

The foregoing process is executed on the assumption that one subject copy includes character codes only. In a case that the subject copy is composed of binary image data scanned by the image reading device 20, it is possible to remove the processes at the steps S2 to S3 in the data terminal device 11, that is, the expansion of the data into a bit image and storage of the expanded data into the memory from the above process. The processes at the other steps are true to this case.

Figure 3:
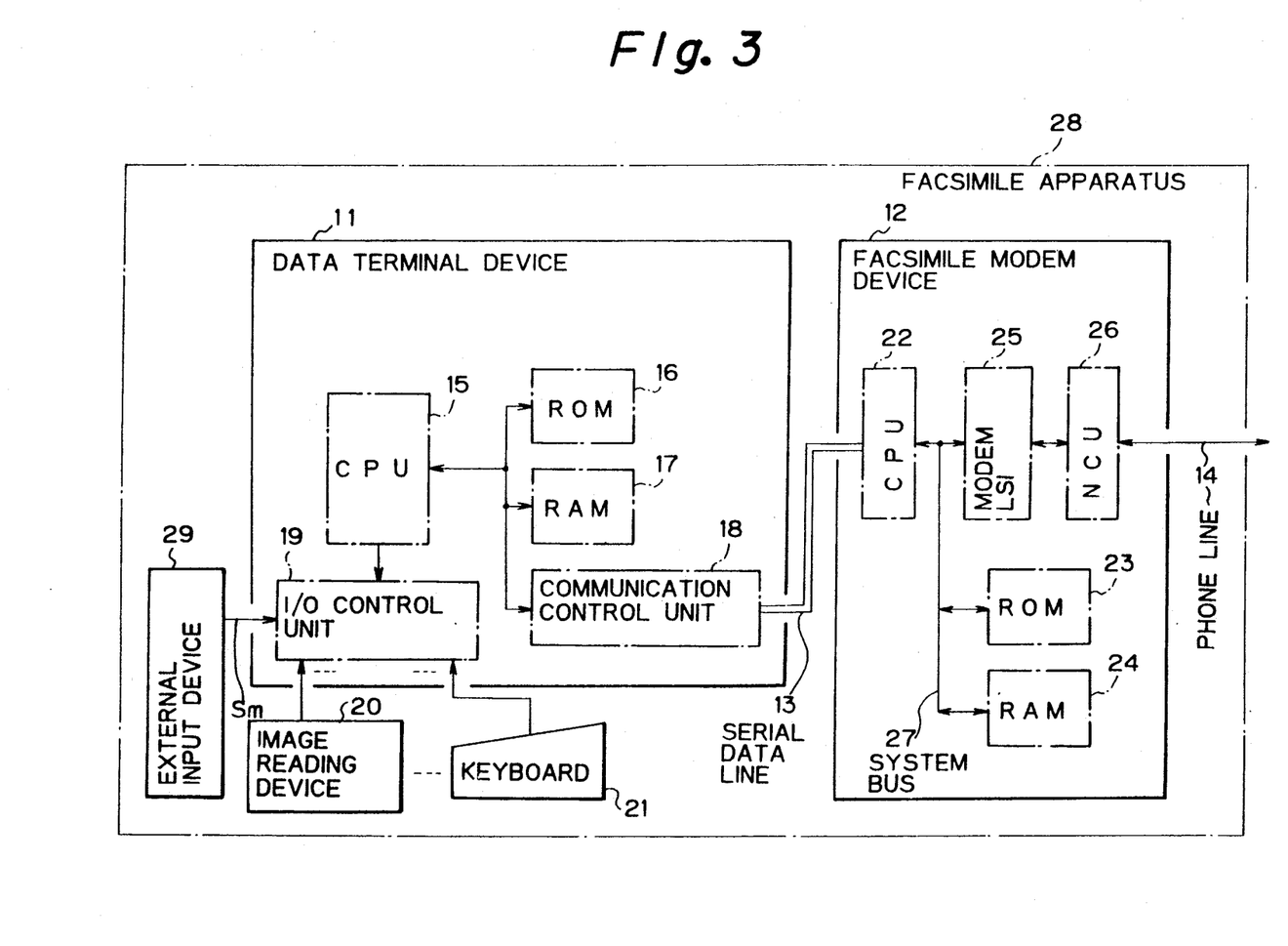
FIG. 3 is a schematic block diagram showing function arrangement of a facsimile apparatus according to an embodiment of the present invention.
Figures 4, 4A:
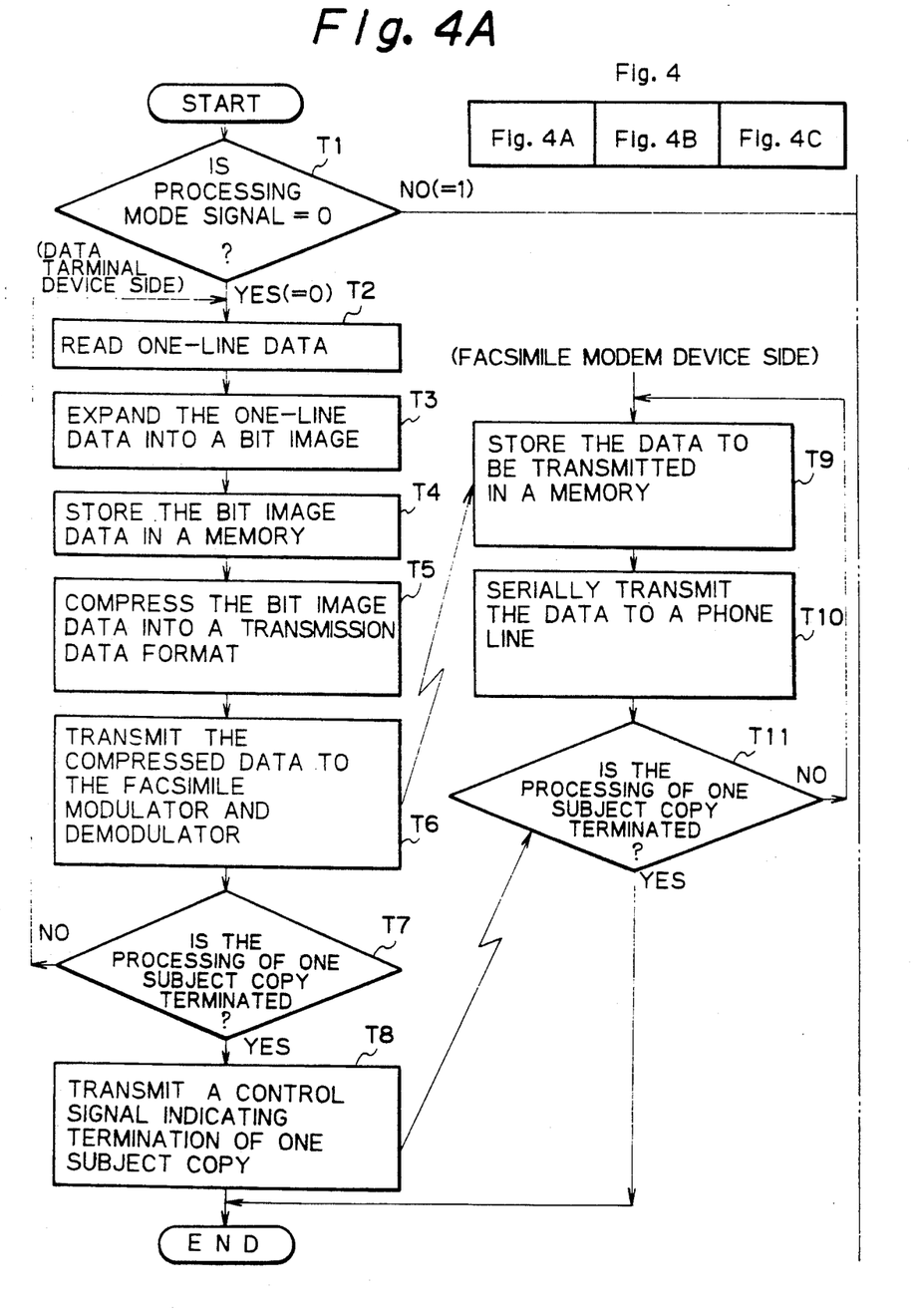

In turn, the description will be directed to an embodiment of the present invention with reference to FIGS. 3 and 4.

FIG. 3 is a schematic block diagram showing functional arrangement of the facsimile apparatus according to an embodiment of the present invention.

A facsimile apparatus 28 shown in FIG. 3 is different from the facsimile apparatus 10 shown in FIG. 1 only in the respect that an external input device 29 is newly provided in the data terminal device 11. Hence, the elements of the facsimile apparatus shown in FIG. 3 which are the same as the elements of the facsimile apparatus shown in FIG. 1 are referred with the same reference numbers and the detailed description of these elements are omitted for convenience in the following description.

The external input device 29 allows data to be inputted from the outside by the user's operation. The other components and functions of the facsimile apparatus shown in FIG. 3 are the similar to the elements of the facsimile apparatus shown in FIG. 1.

The facsimile apparatus 28 according to an embodiment of the present invention includes a data terminal device 11 and a facsimile modem device 12 which are the same as shown in FIG. 1.

Like the facsimile apparatus shown in FIG. 1, the data terminal device 11 has two functions of quantizing the data, that is, expanding the data into a bit image and coding the expanded image, that is, compressing the expanded image data into a transmission data format.

Like the data terminal device 11, the facsimile modem device 12 also has two functions of quantizing the data, that is, expanding the data into a bit image and coding the expanded data, that is, compressing the expanded data into a transmission data format. Hence, the present facsimile apparatus provides a capability of realizing the expansion of the data and the compression of the expanded data both in the data terminal device 11 and in the facsimile modem device 12.

The user can select either one of the devices 11 or 12 for realizing the expansion and compression. The selecting process will be described in detail later.

In FIG. 3, the external input device 29 is connected to an I/O control unit 19 of the data terminal device 11 so that a user can supply an external input signal to a CPU 15 through the I/O control unit 19 by operating the switch. The external input signal includes a processing mode signal Sm (binary signal with 0 and 1 values) indicating whether the data processing such as expansion and compression of the data to be transmitted with a facsimile should be executed in the data terminal device 11 or in the facsimile modulator or demodulator 12. When the processing mode signal Sm is 0, the data terminal device 11 is specified for the data processing. When the processing mode signal Sm is 1, the facsimile modem device 12 is specified for the data processing.

Figure 4B:
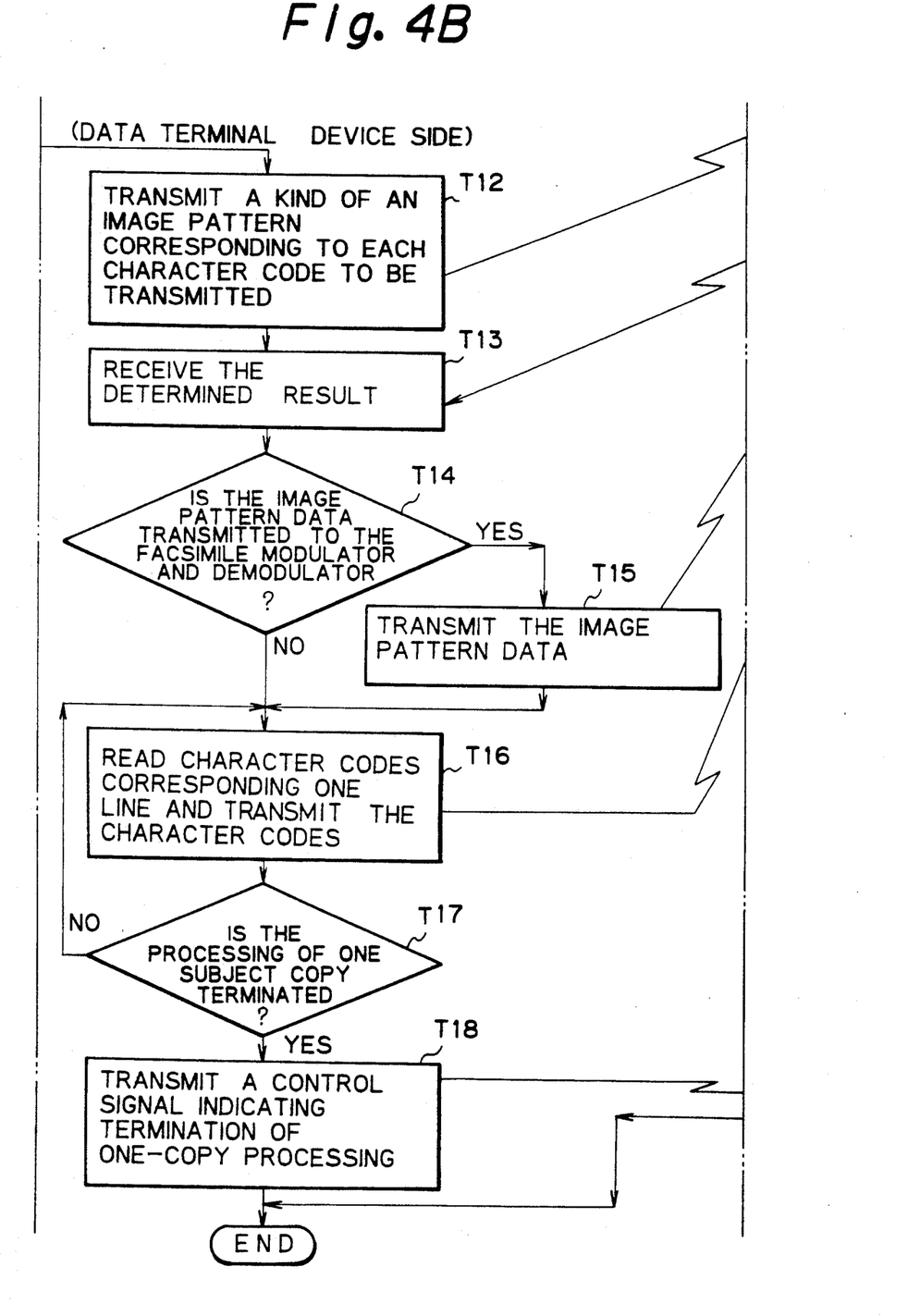
Figure 4C:
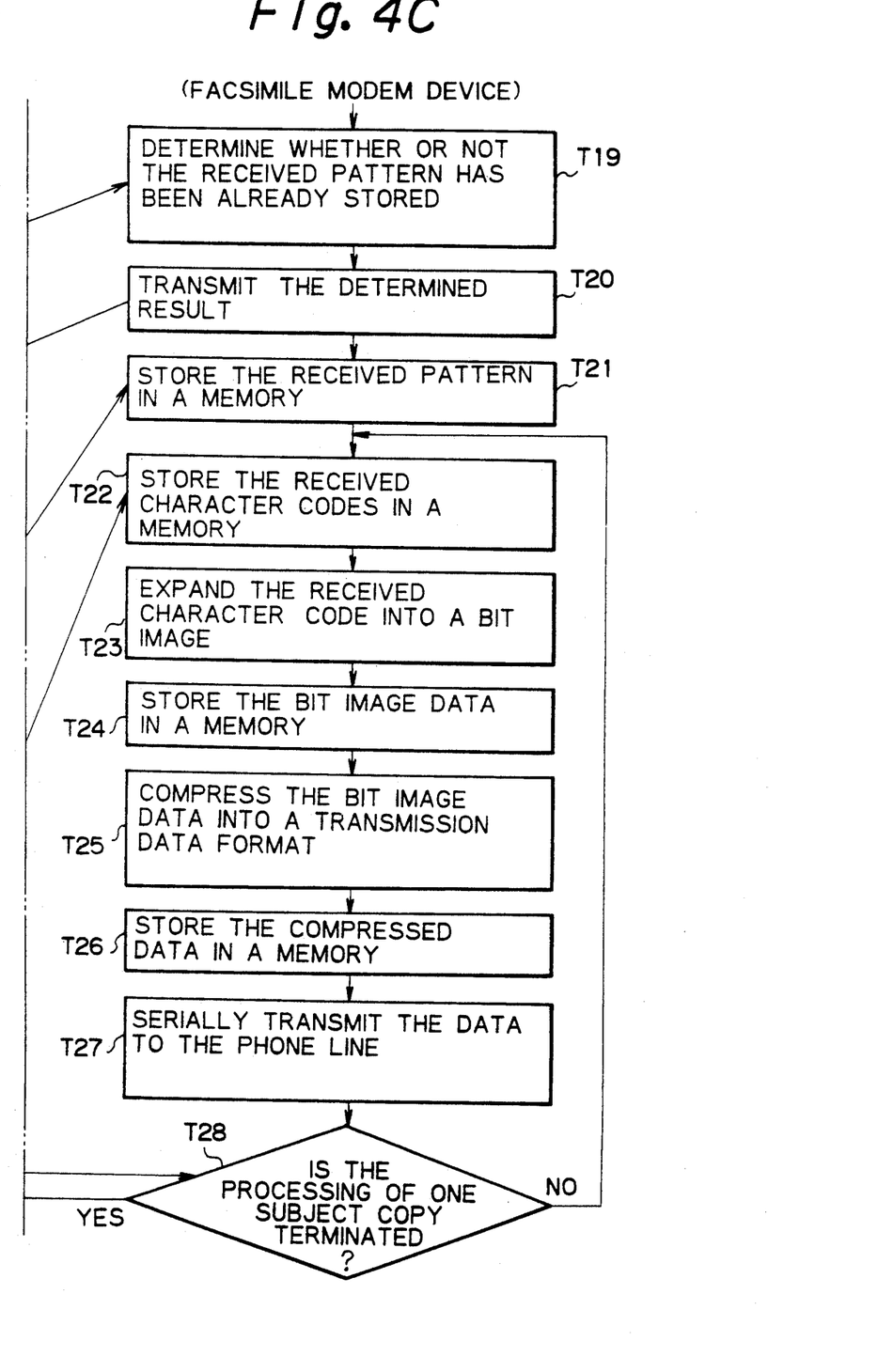

FIG. 4 which is composed of FIGS. 4A, 4B and 4C is a flowchart illustrating the transmitting operation of the facsimile apparatus 28 shown in FIG. 3. Concretely, the flowchart illustrates the processing routine for facsimile-transmitting the data of one subject copy containing characters only.

The processing flow is divided into two flows depending on the content of the processing mode signal Sm. Each divided flow is divided into the flow done in the data terminal device 11 and the flow done in the facsimile modem device 12.

The processing flow of the data terminal device 11 is pre-stored as a program in the ROM 16 of the data terminal device 11. The processing flow of the facsimile modem device 12 is pre-stored as a program in the ROM 23 of the facsimile modem device 12.

Then, the description will be directed to the transmitting operation of the facsimile apparatus 28 shown in FIG. 3 with reference to FIGS. 3 and 4.

In the following description, the phone line 14 is assumed as an exchange line. The description will be left out about the procedure of connecting the transmitting and the receiving facsimile apparatuses and establishing a line link and releasing the exchange line when terminating the communication.

At first, at a step T1 of FIG. 4, the CPU 15 provided in the data terminal device 11 determines whether the processing mode signal Sm supplied through the external input device 29 has a value of 1 or 0. The value of the processing mode signal Sm is set on a user' decision. Alternatively, it may be set on the following criterion.

In a case that the data to be facsimile-transmitted contains diagrams or Chinese characters, the processing mode signal Sm is set to 0 so that the expansion of the data into image data and the compression of the image data into a transmission data format are performed in the data terminal device 11.

In a case that the data to be transmitted contains characters such as English characters, digits, and symbol characters only, the processing mode signal Sm is set to 1 so that the expansion and the compression of the data are performed in the facsimile modem device 12.

The setting of the processing mode signal Sm is, in principle, carried out by the user's operation on the external input device 29.

As an optional unit, the CPU 15 provided in the data terminal device 11 reads the image data to be transmitted from the RAM 17 and automatically sets the processing mode signal Sm depending on the read image data.

Assume that the processing mode signal Sm is set to 0 by the user's operation on the external input device 29. At a step T1, the process goes to the step T2 based on the processing mode signal Sm set to 0.

At the steps T2 to T10, like the foregoing facsimile apparatus 10, the process done in the data terminal device 11 and the facsimile modem device 12 is repeated until the transmission of one subject copy is terminated.

At the processing mode signal Sm=0, the expansion of the image data into image data and the compression of the expanded image data into the transmission data format are carried out in the data terminal device 11. At this mode, the facsimile apparatus 28 performs the transmission in the same manner as the facsimile apparatus 10. Hence, the description about the process is left out.

Next, the process at the processing mode signal Sm=1 will be described.

At the step T1, the processing mode signal Sm is determined to have a value of 1. Hence, the process goes to a step T12.

At the process of the step T12, the CPU 15 reads one-copy data pre-stored in the RAM 17 and transfers the data about the kind of each bit image pattern corresponding to each character code to the facsimile modem device 12 through a serial data line 13.

In response to the transmitting process at the step T12, the CPU 22 of the facsimile modem device 12 receives the data about the kind of the bit image pattern and determines whether or not the bit image pattern corresponding to the received data has been already stored in the RAM 24. The content of the determined result contains the information as to whether or not the bit image pattern is pre-stored in the RAM 24 and if not, the kind of the non-stored pattern. At a next step T20, the determined result is transmitted to the data terminal device 11 through the serial data line 13.

In response to the determined result transmitted at the step T20, at a step T13, the CPU 15 provided in the data terminal device 11 receives the determined result. The received data is transferred to an internal buffer of the CPU 15 through the serial data line 13 and the communication control unit 18, in which buffer the data is temporarily stored. Then, the process goes to a next step T14.

At the step T14, based on the stored data in the process at the step T13, it is determined whether or not the image pattern data is transmitted to the facsimile modem device 12. That is, in response to the determined result that the facsimile modem device 12 has already stored the image pattern data about the character codes of the image data to be transmitted, the process goes to a step T16 or later. In response to the determined result that the facsimile modem device 12 has not yet stored the image pattern data, the process goes to a step T15.

At the step T15, the CPU 15 serves to match the image pattern data non-stored in the facsimile modem device 12 received at the step T13 to its pattern name and transmit the image pattern data to the facsimile modem device 12. The pattern name matched to the image pattern data is the data read from the RAM 17 provided in the data terminal device 11. Then, the process goes to a step T16.

At a step T21, the facsimile modem device 12 receives the image pattern transferred from the data terminal device 11 at the step T15 and stores the non-stored image pattern in the RAM 24 in a manner to match the image pattern to its pattern name.

The processes at the steps T12 and T15 done in the data terminal device 11 and the processes at the steps T19 and T21 done in the facsimile modem device 12 result in completing preparation of all the data required for expanding the data to be transmitted into the image data and compressing the expanded data into the transmission image format.

In the process of the loop composing the steps T16 to T17, the data terminal device 11 reads the character codes corresponding to one line contained in one subject copy and transfers the read one-line character codes to the facsimile modem device 12 through the serial data line 13 under the control of the communication control unit 18. The data terminal device 11 keeps reading one-line character codes and transmitting it to the facsimile modem device 12 until all the lines contained in one subject copy have been transferred. Then, the process goes to a next step T18.

At the step T18, a control signal indicating termination of transmitting one subject copy is transmitted to the facsimile modem device 12 depending on the determined result that the transfer of one-copy data to the facsimile modem device 12 is terminated at the step T17. This is an end step of the process done in the data terminal device 11 at the processing mode signal $Sm=1$.

The facsimile modem device 12, on the other hand, processes the one-copy character codes transferred from the data terminal device 11 in the following manner and transmits the processed codes to the phone line 14.

In response to the process at the step T16 on the side of the data terminal device 11, the CPU 22 provided in the facsimile modem device 12 temporarily stores the received one-line character codes in the RAM 24.

Then, at a next step T23, the one-line character codes stored in the RAM 24 are expanded into bit-image data. Concretely, the CPU 22 serves to specify each address of the RAM 24 in response to an address signal for each character code contained in the one-line data, read the bit-image data from the specified address, and expand each character code into the bit-image data by using the corresponding bit-image data read from the specified address. Then, the process goes to a next step ST24.

At the step T24, the one-line bit-image data expanded at the step T23 is temporarily stored in the RAM 24.

At a next step T25, the CPU 22 serves to remove redundant signal components contained in the expanded and quantized one-line character codes in light of the continuity of 0 and 1 signals, and coding the one-line image data for compressing the one-line image data. It results in coding (compressing) the bit-image data (binary image signal). The compressed image signal (character data) includes such information as allowing an original signal to be completely restored.

At a step T26, the data compressed and coded into the transmission data format is temporarily stored in the RAM 24.

Proceeding to a step T27, the coded data is sequentially read out of the RAM 24 and is transmitted to the phone line 14. The data read out of the RAM 24 is transferred to the modem LSI 25 through the system bus 27, in which LSI the data is modulated. Then, the modulated data is transmitted to the phone line 14 through the network control unit 26 which keeps the transmission characteristic optimal.

In order to match the line speed of the phone line 14 to the data transfer speed in the facsimile apparatus 28, the data to be transmitted is temporarily stored in the RAM 24 and then is sequentially transmitted to the phone line 14.

Proceeding to a step T28, it is determined whether or not the transmission of the one-copy data is terminated. The determination is based on whether or not the facsimile modem device receives the control signal transferred at the step T18 on the side of the data terminal device. In response to the control signal indicating the termination of one-copy transmission, the overall process for transmitting the data is terminated on the side of the facsimile modem device 12.

In a case that the facsimile modem device 12 does not receive the control signal indicating the termination of one-copy transmission, the process returns to the step T22 from which the foregoing process is repeated until the control signal is received. That is, the process done in a loop composed of the steps T22 to T28 is repetitively performed at each group of the character codes corresponding to one line until all the lines contained in one subject copy are transmitted to the phone line 14 (the determination is done at the step T28).

In a case that the processing mode signal Sm has a value of 1, the facsimile modem device 12 is capable of performing the quantizing process of expanding the data into a bit image and the coding process of compressing the bit image into a transmission data format.

In the above description, the present embodiment makes it possible to specify the data terminal device 11 or the facsimile modem device 12 on each copy basis. It is also possible to switch the device on each line and one-dot line basis. It results in transmitting the tabular-format image data more rapidly.

The RAM 24 provided in the facsimile modem device 12 may be backed up by a cell. In a case that the RAM 24 is backed up by a cell, it is not necessary to newly transfer the image data from the data terminal device 11 to the facsimile modem device 12 through the serial data line 13, resulting in reducing the time taken in performing the data processing.

Many widely different embodiments of the present invention may be constructed without departing from the spirit and scope of the present invention. It should be understood that the present invention is not limited to the specification, except as defined in the appended claims.

What is claimed is:

1. A facsimile apparatus capable of enhancing a communication speed with another facsimile apparatus through a transmission line in a network, said facsimile apparatus comprising:
   a facsimile modem means for quantizing image data and coding said image data quantized so that said coded image data is output; and
   a data terminal means for supplying a first indication signal and a second indication signal and transmitting said image data in response to said first indication signal so that said coded image data is transmitted in response to said second indication signal.

2. A facsimile apparatus according to claim 1, wherein said supply means is an external input device for supplying said first indication signal for indicating a transmission of said image data to said facsimile modem means and said second indication signal for indicating a transmission of said coded image data to said facsimile modem means.

3. A facsimile apparatus according to claim 2, wherein said external input device is adapted to be operated in accordance with an operator of said facsimile device.

4. A facsimile apparatus according to claim 1, wherein said facsimile modem means includes a central processing unit for monitoring and controlling said facsimile modem means.

5. A facsimile apparatus according to claim 4, wherein said facsimile modem means further includes a modem LSI for modulating said data to be transmitted and for demodulating said data received from an external thereof.

6. A facsimile apparatus according to claim 5, wherein said facsimile modem means further includes a network control unit for matching an impedance of a phone line to an impedance thereof.

7. A facsimile apparatus according to claim 6, wherein said facsimile modem means further includes a ROM for storing a program required for performing a process of said data stored therein.

8. A facsimile apparatus according to claim 7, wherein said facsimile modem means further includes a RAM for temporarily storing middle data to be transmitted through a system bus.

9. A facsimile apparatus according to claim 1, wherein said data terminal device includes a central processing unit for monitoring and controlling said data terminal means.

10. A facsimile apparatus according to claim 9, wherein said data terminal means further includes a ROM for storing a program required for performing a process of said data stored therein.

11. A facsimile apparatus according to claim 10, wherein said data terminal means further includes a RAM for temporarily storing middle data to be transmitted through a system bus.

12. A facsimile apparatus according to claim 11, wherein said data terminal means further includes an I/O control unit for serving as an interface between said external input device and said data terminal means.

13. A facsimile apparatus according to claim 12, wherein said data terminal means further includes a communication control unit for controlling communication between said data terminal means and said facsimile modem means.

14. A facsimile apparatus according to claim 7, wherein said external input device is an image reading device and/or a keyboard.

15. A facsimile apparatus capable of enhancing a communication speed with another facsimile apparatus through a transmission line in a network, said facsimile apparatus comprising:
   a facsimile modem means for quantizing image data and coding said image data quantized so that said coded image data is output, said facsimile modem means including means for quantizing image data to be inputted, means for coding said image data quantized in said quantizing means, and means for sending coded data to said data transmission line; and
   a data terminal means for supplying a first indication signal and a second indication signal and for transmitting image data to the facsimile modem means in response to said first indication signal and for transmitting coded image data to the facsimile modem means in response to the second indication signal, said data terminal means including means for supplying the first indication signal and the second indication signal, means for transmitting the image data to the facsimile modem means in response to the first indication signal supplied from the supply means, and means for transmitting the coded image data to the sending means of the facsimile modem means in response to the second signal supplied by the supply means.

* * * * *